(12) United States Patent
Ravantab et al.

(10) Patent No.: US 11,618,505 B2
(45) Date of Patent: Apr. 4, 2023

(54) FRAME STRUCTURE FOR AN ENERGY STORAGE DEVICE INCLUDING A DEFORMATION ZONE

(71) Applicant: Volvo Car Corporation, Gothenburg (SE)

(72) Inventors: Aria Ravantab, Kungälv (SE); Fredrik Övgård, Gothenburg (SE); Srikanth Varanasi, Hisings Backa (SE); Sven Ström, Alingsås (SE); Krister Amundsson, Partille (SE)

(73) Assignee: Volvo Car Corporation, Gothenburg (SE)

( * ) Notice: Subject to any disclaimer, the term of this patent is extended or adjusted under 35 U.S.C. 154(b) by 259 days.

(21) Appl. No.: 17/075,748

(22) Filed: Oct. 21, 2020

(65) Prior Publication Data
US 2021/0122423 A1     Apr. 29, 2021

(30) Foreign Application Priority Data
Oct. 23, 2019     (EP) .................................. 19204821

(51) Int. Cl.
*B62D 21/15*     (2006.01)
*B60K 1/04*     (2019.01)
*B62D 21/03*     (2006.01)

(52) U.S. Cl.
CPC .............. *B62D 21/157* (2013.01); *B60K 1/04* (2013.01); *B62D 21/03* (2013.01); *B60K 2001/0422* (2013.01); *B60K 2001/0433* (2013.01)

(58) Field of Classification Search
CPC .. B62D 21/157; B62D 21/03; B62D 25/2036; B62D 25/20; B60K 1/04; B60K 2001/0422; B60K 2001/0433; Y02T 10/70

(Continued)

(56) References Cited

U.S. PATENT DOCUMENTS 9,034,502 B2     5/2015   Kano et al.
9,061,712 B2 *   6/2015   Patberg ................ B62D 21/157
(Continued)

FOREIGN PATENT DOCUMENTS

DE     102004045867 A1     4/2006
DE     202016107206 U1     2/2017
(Continued)

OTHER PUBLICATIONS

Apr. 9, 2020 European Search report issued on International Application No. 19204821.

*Primary Examiner* — D Glenn Dayoan
*Assistant Examiner* — E Turner Hicks
(74) *Attorney, Agent, or Firm* — Clements Bernard Walker; Christopher L. Bernard

(57) ABSTRACT

A frame structure for maintaining energy storage devices of a vehicle in position which is deformed in a controlled way in the event of a side-impact, in such a way to avoid deforming into the location of the vehicle seats. The proposed frame structure is adapted to deform controllably in a centre position align with a location between the vehicle seats. In this way are occupants of the vehicle kept safe since no or less deformation occur in the vehicle seat location. The above advantages are provided by that lateral support members of the frame includes a deformation zone adapted to deform in response to a lateral force exerted on the lateral support member. The deformation zone is located such that, when the frame structure is installed in the vehicle, the deformation zone is aligned with a location between seats of the vehicle.

20 Claims, 4 Drawing Sheets

(58) Field of Classification Search
USPC .......................... 296/204, 193.07, 187.08, 30
See application file for complete search history.

(56) References Cited

U.S. PATENT DOCUMENTS

| | | |
|---|---|---|
| 9,673,433 B1 | 6/2017 | Pullalarevu et al. |
| 2010/0237659 A1* | 9/2010 | Ishigame ............. B62D 25/025 |
| | | 296/204 |
| 2014/0333091 A1* | 11/2014 | Stockard ................ F16F 7/125 |
| | | 296/187.03 |
| 2017/0355255 A1 | 12/2017 | Brausse et al. |
| 2018/0229593 A1 | 8/2018 | Hitz et al. |
| 2019/0184831 A1* | 6/2019 | Yokoyama ............ H01M 50/20 |

FOREIGN PATENT DOCUMENTS

| | | |
|---|---|---|
| JP | 6149505 B2 | 6/2017 |
| WO | 2015019742 A1 | 2/2015 |

* cited by examiner

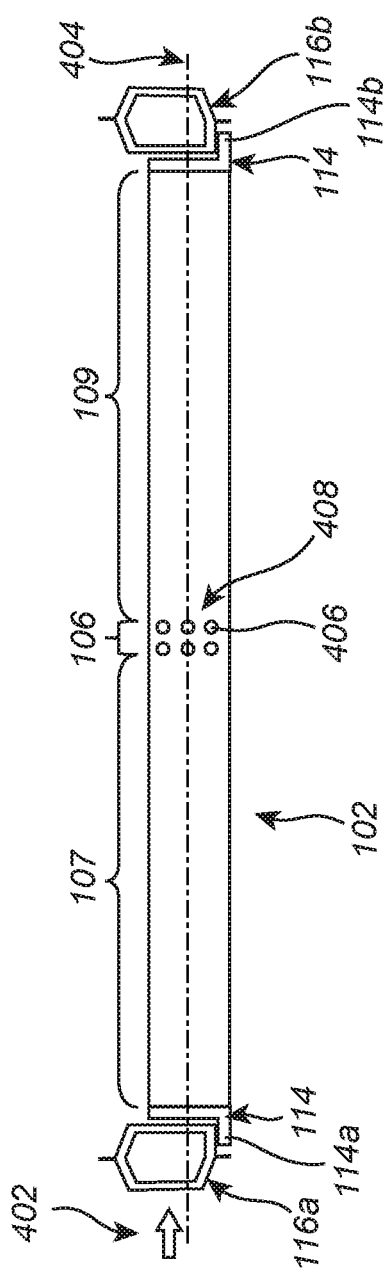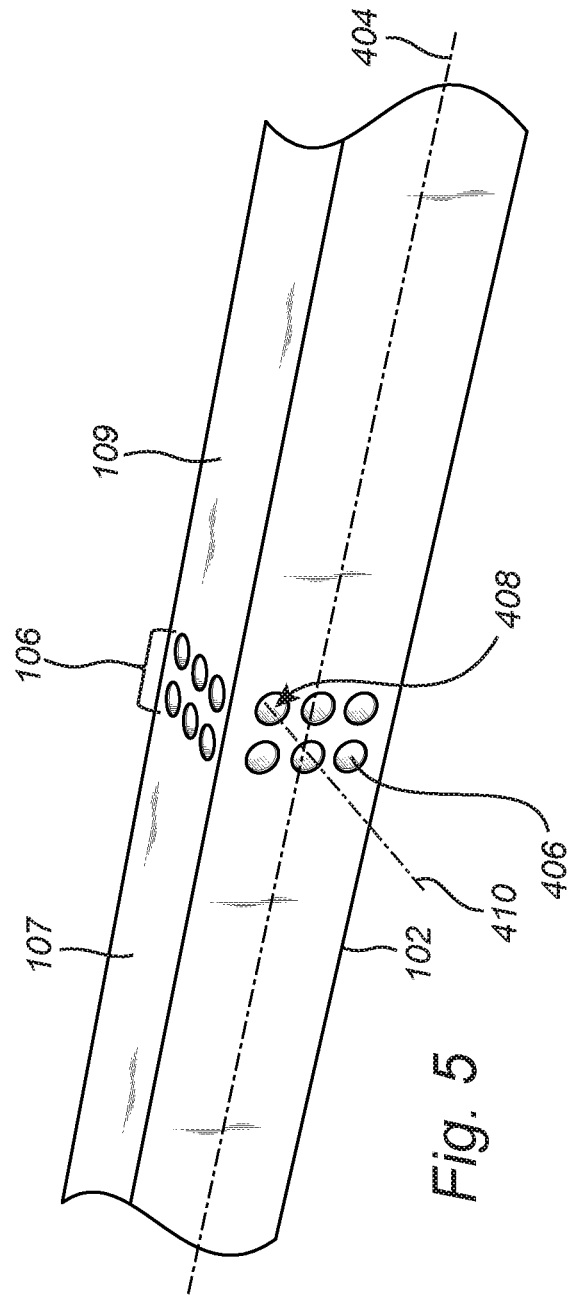

FRAME STRUCTURE FOR AN ENERGY STORAGE DEVICE INCLUDING A DEFORMATION ZONE

CROSS-REFERENCE TO RELATED APPLICATION

The present disclosure claims the benefit of priority of co-pending European Patent Application No. 19204821.3, filed on Oct. 23, 2019, and entitled "A FRAME STRUCTURE FOR AN ENERGY STORAGE DEVICE INCLUDING A DEFORMATION ZONE," the contents of which are incorporated in full by reference herein.

TECHNICAL FIELD

The present disclosure relates to frame structure for maintaining energy storage devices of a vehicle in position. The present disclosure further relates to an energy storage module, and to a vehicle including an energy storage module.

BACKGROUND

As vehicles are becoming electrified the batteries increase in size. The so-called traction batteries that are used for providing propulsion for the vehicle are thus relatively large and heavy and must be supported by firm mechanical structures to maintain in place as the vehicle travels. The traction batteries are often arranged in a location under the floor of the vehicle, which inventively leads to that traction batteries are often arranged under the seats in the vehicle.

For protecting the battery in the event of a crash, the structure surrounding the traction battery must be able to handle large forces, in particular in the event of a side impact since the traction battery often is located relatively close to the outer side structures of the vehicle. The structures surrounding the battery are often adapted to deform in a predetermined way to thereby absorb energy from the crash and to avoid the energy to be absorbed by the traction battery itself.

However, the deformation of the structures may affect other parts of the vehicle in undesirable ways and may even be a hazard to the occupants of the vehicle. There is therefore a need for improved ways of protecting a traction battery of a vehicle in the event of a side-impact on the vehicle.

SUMMARY

The present disclosure generally relates to a frame structure for maintaining energy storage devices of a vehicle in position which is deformed in a controlled way in the event of a side-impact. The frame structure is deformed in such a way to avoid deforming into the location of the vehicle seats.

The proposed frame structure is adapted to deform controllably in a centre position aligned with a location between the vehicle seats. In this way are occupants of the vehicle kept safe since no or less deformation occur in the vehicle seat location.

The above advantages are provided by that lateral support members of the frame structure includes a deformation zone adapted to deform in response to a lateral force exerted on the lateral support member. The deformation zone is located such that, when the frame structure is installed in the vehicle, the deformation zone is aligned with a location between seats of the vehicle. Accordingly, the risk of the deforming frame structures to penetrate into the vehicle seats where occupants may be located is significantly reduced with the herein proposed frame structure, thereby better protecting the occupants.

The deformation zones are tailored to be deformed at a predetermined force depending on specific load cases.

Furthermore, the lateral support members of the proposed frame structure are adapted to be arranged along a transverse direction of the vehicle to thereby be able to absorb energy from side impacts. The lateral support members define at least one pocket for holding an energy storage device. In other words, the frame structure may be part of the energy storage module holding the energy storage device.

In one embodiment, the deformation zones may be configured to deform telescopically along a longitudinal axis of the lateral support members. Thereby, the risk of the deforming lateral support members to penetrate in the vehicle compartment, located vertically from the lateral support members is further reduced.

Further features of, and advantages with, the embodiments of the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF DRAWINGS

These and other aspects of the present disclosure will now be described in more detail, with reference to the appended drawings showing example embodiments of the invention, wherein:

FIG. 4 conceptually illustrates a lateral support member arranged between side beams according to embodiments of the present disclosure; and FIG. 5 conceptually illustrates a partial lateral support member according to embodiments of the present disclosure.

DETAILED DESCRIPTION

Figure 1:
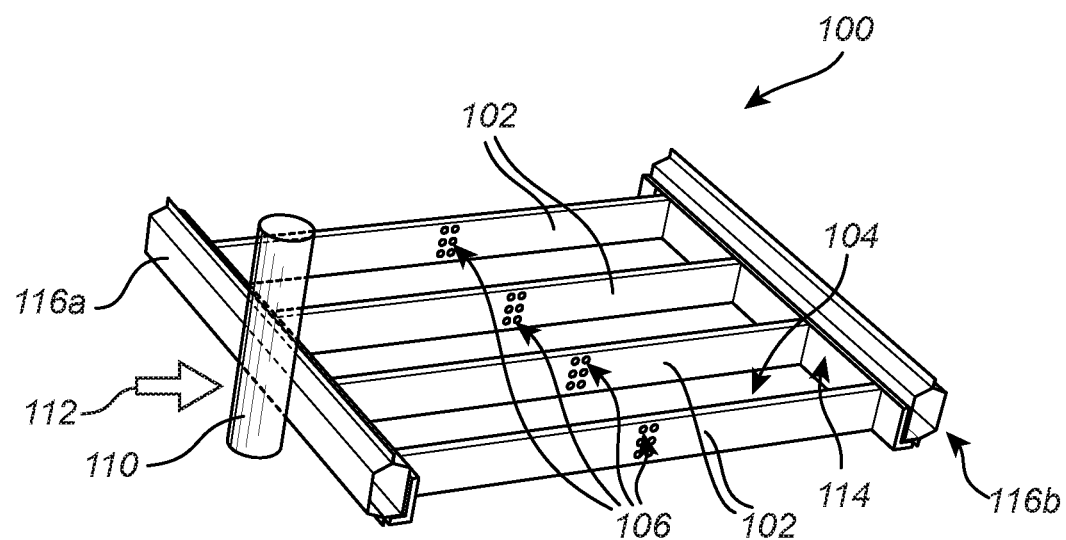
FIG. 1 is a perspective view of a frame structure according to embodiments of the present disclosure.

In the present detailed description, various embodiments of a frame structure according to the present invention are described. However, the frame structure of the present disclosure may be embodied in many different forms and should not be construed as limited to the embodiments set forth herein; rather, these embodiments are provided for thoroughness and completeness, and to fully convey the scope of the invention to the skilled person. Like reference characters refer to like elements throughout.

FIG. 1 conceptually illustrates a frame structure 100 according to embodiments of the present disclosure. The frame structure 100 is configured for maintaining electrical energy storage devices of a vehicle in position. The frame structure 100 includes a set of lateral support members 102 adapted to be arranged along a transverse direction of the vehicle. The lateral support members 102 defines at least one pocket 104 for holding an electrical energy storage device (not shown). At least one of the lateral support members 102 includes a deformation zone 106 adapted to deform in response to a lateral force 112 exerted on the lateral support member, for example as caused by an object 110 sideways colliding with the vehicle. The lateral support members 102 are configured such that the deformation zone 106 is aligned with a location between seats of the vehicle, when the frame structure 100 is installed in the vehicle.

It has been realized that electrical energy storage modules including electrical energy storage devices and supporting frame structure should be able to absorb collision energy in the event of a side impact, and at the same time not cause unnecessary risk of injury to occupants of the vehicle. Therefore, based on the above realization, the present disclosure provides lateral support members of the frame structure that accommodates the electrical energy storage devices, with deformation zones. The deformation zones are adapted to deform in the event of a collision that transfers energy into the lateral support member along its main longitudinal axis. As the deformation zones deform, they absorb collision energy. Further, the deformation occurs in a controlled way due to a specific configuration and location of the deformation zones. In particular, it has been realized that, in order to reduce the risk of injury to the occupants of the vehicle, the deformation zones should align with a location between seats of the vehicle.

Purely as an example, the frame structure 100 conceptually shown in FIG. 1 has four lateral support members 102. Adjacent lateral support members define a pocket 104 into which an electrical energy storage device may be arranged and maintained in place. One such electrical energy storage device may include multiple cells, e.g. battery cells.

The lateral support members 104 are here shown connected through longitudinal support members 114 at end portions of the lateral support members. The frame structure 100 may be attached to the vehicle body structure 116a-b which may be side rocker beams or floor support beams, sometimes also called sill beams. Thus, the lateral support members 102 may be adapted to reach from one side beam 116a to another side beam 116b of the vehicle.

Purely as an example, the lateral support members 104 may be lateral metal beams welded together with the longitudinal support members 114 also provided as metal beams. The lateral support members 104 may for example include aluminium and be manufactured by extrusion. However, any ductile strong material may be used for the lateral support members 104 and the longitudinal support members 114.

Preferably, the deformation zones are located in center portions of the lateral support members in order to more easily ensure that the deformation zone is aligned between the seats of the vehicle.

Preferably, each of the lateral support members 102 include a deformation zone 106. Thereby, more energy from a collision may be absorbed by deformation zones along the entire side of the frame structure. Furthermore, each of the lateral support members may in this way be controllably deformed, more occupants in the vehicle may be exposed to reduced risk of injury from deforming frame structures.

Figure 2:
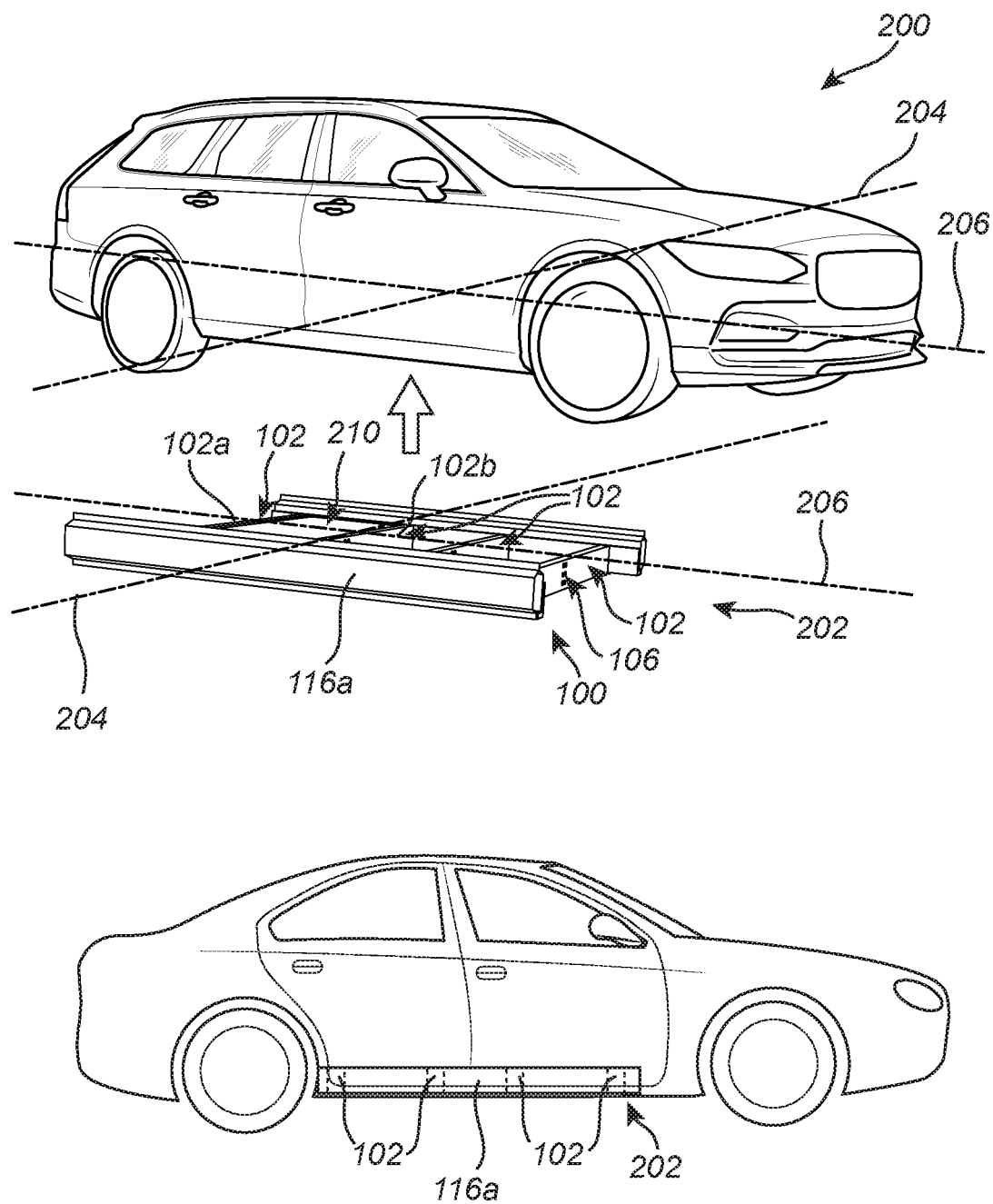
FIG. 2 conceptually illustrates an energy storage module including a frame structure arranged in a vehicle according to embodiments of the present disclosure.

FIG. 2 conceptually illustrates a vehicle 200, here embodied as a car, having an electrical energy storage module 202 arranged in the vehicle 200. The vehicle 200 is preferably an at least partly electrified vehicle such as being a hybrid vehicle or a fully electric vehicle. The electrical energy storage module 202 includes the frame structure 100 including the set of lateral support members 102 arranged in a transverse direction 204 of the vehicle 200. The transverse direction 204 is in a side-to-side direction of the vehicle, perpendicular to an axis 206 in a heading direction of the vehicle.

The energy storage module 202 includes electrical energy storage devices, here only one electrical energy storage device 210 is shown for clarity in the drawing. The energy storage device 210 is arranged in a pocket formed from two adjacent lateral support members 102a and 102b. The the energy storage device 210 is interleaved between the lateral support members 102a-b.

Preferably, the energy storage devices including 210 are batteries for providing electrical propulsion energy to the vehicle. An energy storage module 200 may include multiple batteries each including a plurality of battery cells, such as Li-Ion cells.

Figure 3:
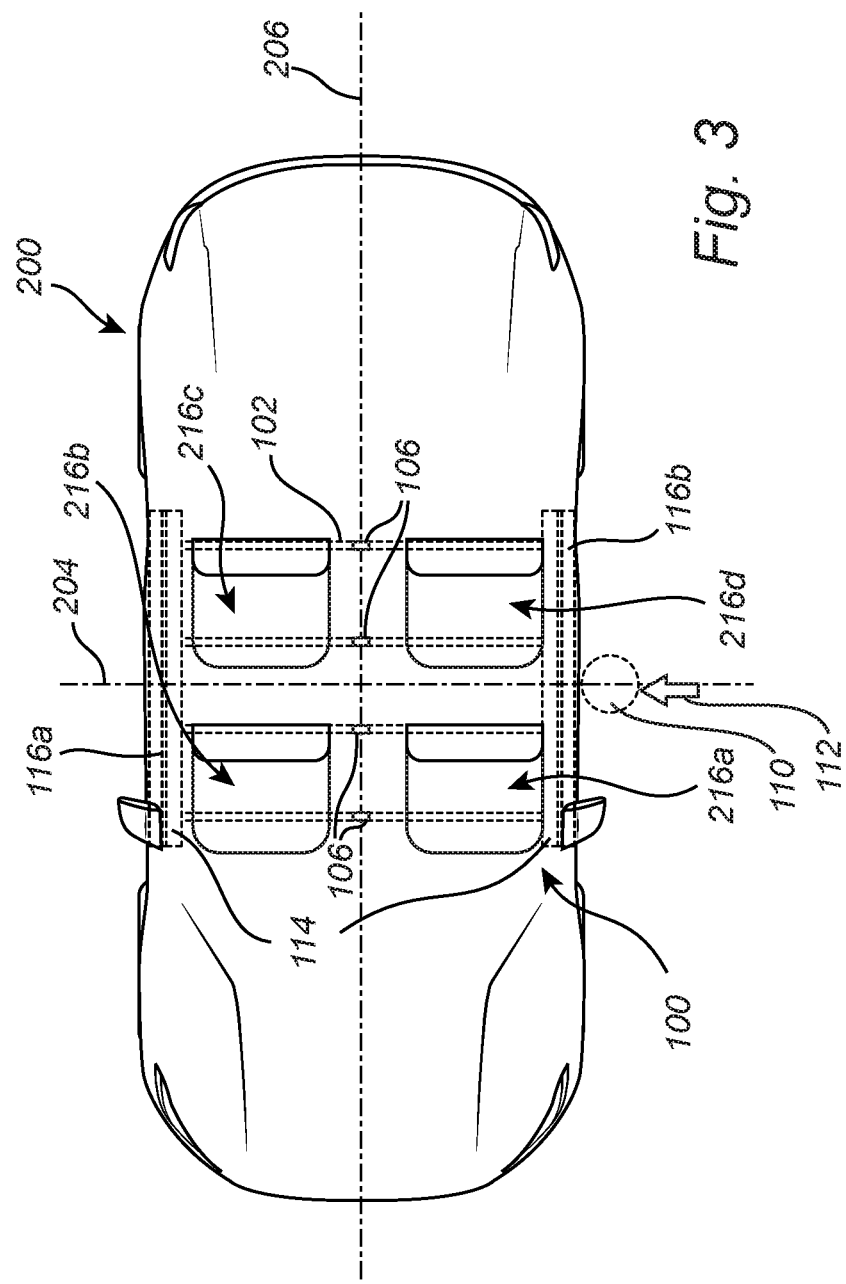
FIG. 3 conceptually illustrates an energy storage module including a frame structure arranged in a vehicle according to embodiments of the present disclosure.

FIG. 3 illustrates a top view of the vehicle 200 having the frame structure 100 arranged below the vehicle floor. The electrical energy storage devices are omitted in FIG. 3. In the vehicle interior there are four vehicle seats 216a,b,c,d. Vehicle seats 216a and 216b are front seats, and vehicle seats 216c and 216d are rear seats arranged behind the front seats 216a,b along the axis 206 parallel with a general heading direction of the vehicle 200.

The frame structure 100 is arranged such that the deformation zones 106 are aligned between the vehicle seats that are laterally disposed. In other words, the deformation zones 106 which are included in the lateral support members 102 that are transversely arranged in the vehicle 200, are aligned between the front seats 216a-b, or between the rear seats 216c-d. For example, at least one of the deformation zones 106 is aligned between the front seats 216a-b.

Accordingly, the deformation of the lateral support members 102 occur in a location between the vehicle seats to thereby reduce the risk of the deformation injuring occupants of the vehicle. Thus, with the deformation zones aligned between the vehicle seats the deformation occurs further from the occupants compared to other deformation locations.

FIG. 4 conceptually illustrates a side view of a lateral support member 102, e.g. a lateral beam 102 of a frame structure, e.g. as shown in FIG. 1. The lateral support beam 102 is arranged to reach between the longitudinal support beams 114 that are attached through e.g. welding or with screws or bolts to the side beams 116a-b of the vehicle. The longitudinal support beams 114 are here exemplified as having an L-shaped cross-section, although other possible longitudinal support beams configurations are possible and within the scope of the present disclosure. The L-shaped longitudinal support beams 114 provide for attaching the frame structure 100 from below the below at the shoulder portions 114a-b reaching under the side beams 116a-b.

The lateral support beam 102 includes a deformation zone 106 which is adapted to deform when exerted to sufficiently strong force 402. As a result of the force 402, the deformation zones are preferably configured to deform telescopically along a longitudinal axis 404 of the lateral support beam 102. The longitudinal axis 404 is parallel with the transverse direction 204 of the vehicle 200, when the frame structure is arranged in the vehicle for use.

A telescopic deformation of the lateral support member 102 is understood to cause a compression of the lateral support member 102 along the longitudinal axis 404. The compression is irreversible, thus the deformation zone 106 is collapsed along the longitudinal axis 404 such that the length of the lateral support member along the longitudinal axis 404 is reduced. The deformation zone 106 may be irreversibly deformed when exposed to high enough force 402.

The deformation zone 106 is structurally weaker than the adjacent portions 107 and 109 of the lateral support member 102. In this way it is ensured that it is the deformation zone 106 that deforms before the adjacent portions 107 and 109. The structurally weaker deformation zone 106 is thus designed to collapse along the longitudinal axis 404 when exerted to a force lower than required to deform the adjacent portions 107 and 109. Accordingly, the adjacent portions may withstand higher forces 402 along the longitudinal axis 404 compared to the structurally weaker deformation zone 106.

The deformation zone 106 is designed to be deformed when the lateral force 402 exceeds a threshold. Accordingly, the structural weakness of the deformation zone 106 is made, by well adapted configuration, to be deformed to absorb energy when the applied force 402 is in a range known from empirical tests or from simulations of crash scenarios.

The deformation zone 106 may be realized in various ways. In one embodiment, the deformation zones may include holes 406 in the lateral support members 102. In other words, holes may be formed in the lateral support member 102 which may be a hollow beam. For example, through-holes may be made in the material of the hollow beam such that a see-through hole is formed in the hollow inner space of the hollow beam 102. The holes are made in a direction perpendicular to the longitudinal axis 404. In other possible implementations are recesses formed instead or in addition to the holes 404. Forming recesses is another possible way to provide a structurally weaker deformation zone 106 compared to the adjacent beam portions 107 and 109.

In embodiments, the deformation zone 106 have a length along the lateral beam 102 that is shorter than the length of each lateral beam portions 107, 109 that is outside the deformation zone 106. In other words, the length of the deformation zone 106 along the longitudinal axis 404 is shorter than each of the adjacent lateral beam portions 107, 109. However, the length of the deformation zone 106 is still sufficiently long to provide a telescopic deformation of the lateral beam that allows for adequate energy absorption.

The shape of the holes may be e.g. elongated, or in other possible implementations, the shape of the holes is circular as illustrated in e.g. FIG. 4-5, or square, or with a polygon shape.

In embodiments, the deformation zones may include an array 408 of holes in the lateral support members 102. For example, as conceptually illustrated in FIG. 5, the array 408 of holes 406 may extend around the entire circumference of the lateral support member. The layout of the array of holes may be adapted to specific implementations.

In one embodiment the deformation zone has six circular holes per side of the lateral beam 102. In one embodiment the deformation zone has holes with center axis' intercepting the pockets 114. The holes may each have a center axis along the heading 206 of the vehicle when installed in the vehicle. In one embodiment the deformation zones only have holes with center axis' intercepting the pockets 114. The center axis intercepting the pockets 114 may be generally horizontal when the frame structure is installed in a vehicle, and the vehicle is standing on a horizontal ground.

In embodiments, the lateral support member and the respective deformation zone are made in one piece. This allows for a cost-efficient manufacturing processing. For example, the lateral support member may be manufactured by extrusions, and the holes 406 for forming the deformation zone 106 may be made by punching or machining the holes through the material of the lateral support member 102.

Another possible way to manufacture a lateral support member according to embodiments of the present disclosure is to manufacture the deformation zone 106 from a different material and/or in a different extrusion direction compared to the adjacent portions 107 and 109, and subsequently attached the adjacent beam portions 107 and 109 on opposite sides of the deformation zone.

The person skilled in the art realizes that the present invention by no means is limited to the preferred embodiments described above. On the contrary, many modifications and variations are possible within the scope of the appended claims.

For example, the material choice for the lateral support members may be selected from other materials suitable for holding energy storage devices in place and that are able to provide for making a deformation zone in the material. A non-exhaustive list of materials for the lateral support member includes aluminium, aluminium alloys, steal, 3D-printable polymers. The later support members is made extruded aluminium in one preferred embodiment.

The vehicle may be of various types, such as a light-duty vehicle e.g. a car, although trucks may also be applicable.

Example dimensions of the lateral support members is 20-30 mm in width, i.e. along the axis 206 in FIG. 2, and 100-150 mm in height. Further, the thickness of the material of the lateral support members, e.g. as provided in the form of a hollow beam, is about 3-6 mm.

A typical load case for which the deformation zones are adapted may be a pole with diameter of 250 mm impacting on the vehicle from the side.

The energy storage devices may be interleaved between the lateral support members.

The energy storage devices may be batteries for providing electrical propulsion energy to the vehicle.

The energy storage module may be adapted to be arranged below the seats of the vehicle.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. Any reference signs in the claims should not be construed as limiting the scope.

Various examples have been described. These and other examples are within the scope of the following claims.

The invention claimed is:

1. A frame structure for maintaining an electrical energy storage device of a vehicle in position, the frame structure comprising:
   a set of lateral support members adapted to be arranged along a transverse direction of the vehicle, the lateral support members define at least one pocket for holding an electrical energy storage device such that the energy storage device is interleaved between the lateral support members,
   wherein at least one of the lateral support members includes a deformation zone adapted to deform in response to a lateral force exerted on the lateral support member, the lateral support members are configured such that the deformation zone is aligned with a location between seats of the vehicle, when the frame structure is installed in the vehicle.

2. The frame structure according to claim 1, wherein the deformation zone is configured to deform telescopically along a longitudinal axis of the lateral support members.

3. The frame structure according to claim 1, wherein the deformation zone is located in a center portion of the lateral support member.

4. The frame structure according to claim 1, wherein each of the lateral support members includes a deformation zone.

5. The frame structure according to claim 1, wherein the lateral support member and the respective deformation zone are made in one piece.

6. The frame structure according to claim 1, wherein the deformation zone is structurally weaker than adjacent portions of the lateral support member.

7. The frame structure according to claim 1, wherein the deformation zone includes holes in the lateral support member.

8. The frame structure according to claim 7, wherein the deformation zone includes an array of holes in the lateral support member that extend around the entire circumference of the lateral support member.

9. The frame structure according to claim 1, wherein the lateral support members are adapted to reach from one side beam to another side beam of the vehicle.

10. The frame structure according to claim 1, wherein the lateral support members are connected through longitudinal support members at end portions of the lateral support members.

11. The frame structure according to claim 1, wherein lateral support members are made from extrusions.

12. The frame structure according to claim 1, wherein the lateral support members are made from a material including aluminum.

13. The frame structure according to claim 1, wherein the deformation zone has a length along the respective lateral support member that is shorter than a length of each lateral beam portion that is outside the deformation zone.

14. The frame structure according to claim 8, wherein the holes are circular.

15. An energy storage module for a vehicle, comprising:
a frame structure according to claim 1; and
an electrical energy storage device arranged in the pocket of the frame structure.

16. The energy storage module according to claim 15, wherein the electrical energy storage device comprises a plurality of electrical energy storage devices that are interleaved between the lateral support members.

17. The energy storage module according to claim 15, wherein the electrical energy storage device is a battery for providing electrical propulsion energy to the vehicle.

18. The energy storage module according to claim 15, wherein the energy storage module is adapted to be arranged below seats of the vehicle.

19. A vehicle comprising the energy storage module according to claim 15.

20. The vehicle according to claim 19, wherein the energy storage module is arranged below seats of the vehicle.

* * * * *